Nov. 3, 1931.     I. J. REMARK     1,830,676
MOLD
Filed April 21, 1927     2 Sheets-Sheet 1

INVENTOR
Isidore J. Remark.
BY Evans & McCoy
ATTORNEYS

Nov. 3, 1931.  I. J. REMARK  1,830,676
MOLD
Filed April 21, 1927    2 Sheets-Sheet 2

INVENTOR
Isidore J. Remark.
BY
Evans & McCoy
ATTORNEYS

Patented Nov. 3, 1931

1,830,676

UNITED STATES PATENT OFFICE

ISIDORE J. REMARK, OF AKRON, OHIO, ASSIGNOR TO THE GENERAL TIRE & RUBBER COMPANY, OF AKRON, OHIO, A CORPORATION OF OHIO

MOLD

Application filed April 21, 1927. Serial No. 185,498.

This invention relates to molds for cushion tires of rubber or other moldable composition and particularly to a cushion tire mold having a pair of opposed side portions and a separate segmental tread forming portion.

In molds of this general character that have heretofore been proposed, the mold breaking groove is formed between the side sections. Considerable difficulty has been experienced with such molds because of the tendency of the segmental tread forming portions of the mold to improperly separate from the side portions. This at times so seriously damages the tire as to cause its rejection and consequently greatly increases the cost of manufacture of the cushion tires manufactured therein.

According to this invention I propose an improved form of mold in which the breaking groove is formed between one only of the mold portions and the segmental tread forming portions of the mold unit.

I also proposed an improved form of tool for breaking the tread forming mold unit away from the finished tire and from the other mold portions.

One object of this invention is to insure removal of the tread forming segmental mold portions with the proper side portion of the mold.

An additional object of the invention is to provide a suitable tool for breaking the tread forming portion of the mold away from the tire casing.

Figure 1 of the accompanying drawings is a side elevational view of a mold assembly constructed in accordance with this invention.

Figure 1:
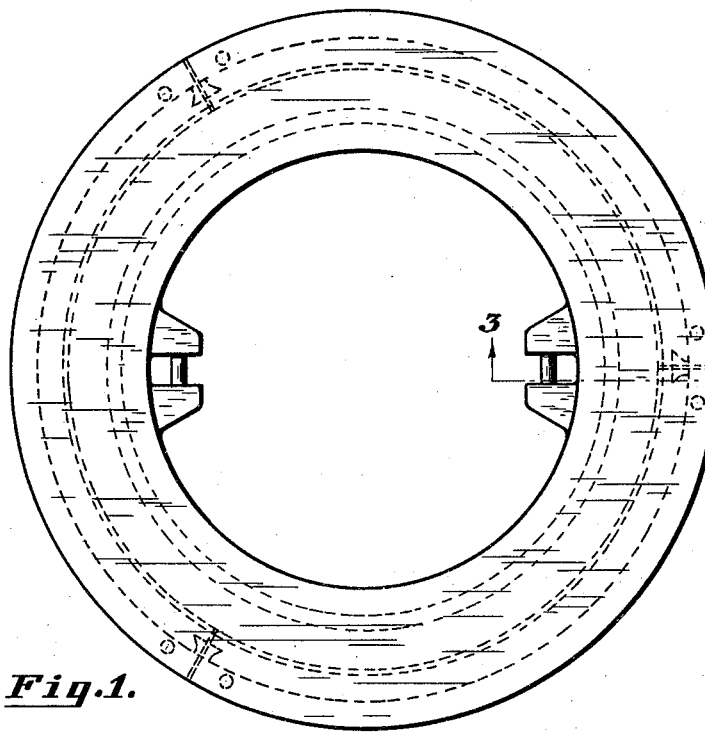
Figure 2:
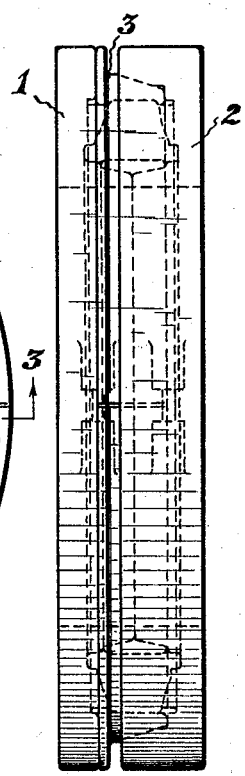
Fig. 2 is a front elevational view of the mold shown in Fig. 1.
Figure 3:
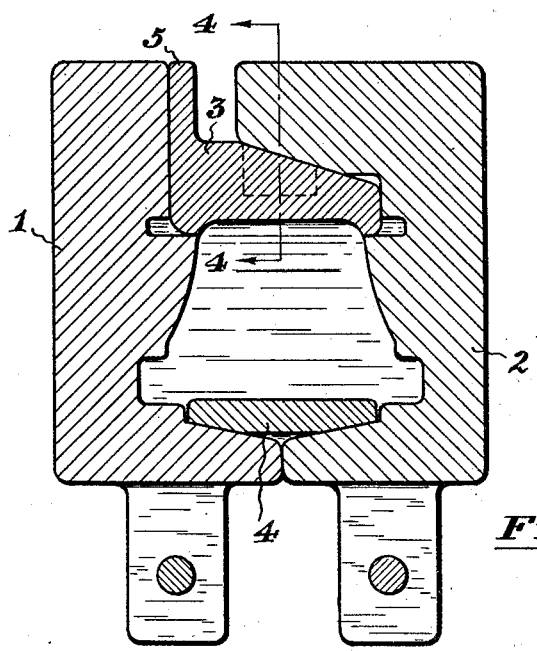
Fig. 3 is an enlarged transverse sectional view, taken substantially on line 3—3 of Fig. 1, of the assembled mold.
Figure 4:
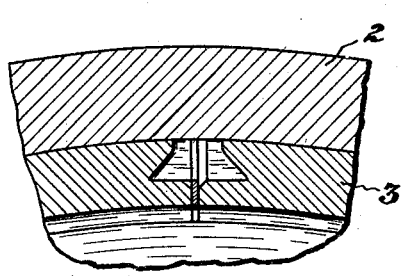
Fig. 4 is a corresponding sectional view taken substantially on line 4—4 of Fig. 3.

The mold shown in the accompanying drawings comprises a pair of mold sections 1 and 2 that are suitably formed to receive therebetween segmental tread forming mold portions 3 that are clamped in place between the side members to define therewith the molding cavity. The side members 1 and 2 are also provided with suitable annular depressed seats for receiving a mold ring 4 for supporting the tire base (not shown). The side members 1 and 2 and the mold ring 4 of the mold are of conventional character.

The segmental tread forming portions 3 of the mold have suitable overflow pockets of the conventional character formed therebetween for receiving any overflow material from the moldable material received within the molding cavity.

The segmental mold portions 3 each has an inclined wedging and seating face that contacts with a similarly inclined overhanging seating face of the mold member 2 to position the segmental tread forming elements. The other side of each mold portion 3 has a flat face that abuts a correspondingly formed face of the side member 1. Each of the segmental tread forming mold portions has a segmental flange 5 formed thereon that extends outwardly from the body portion of the mold section to provide a breaking groove between the tread forming mold parts and the side member 2.

The tire to be formed is mounted in the molding cavity in precisely the same way as in the prior structures. After vulcanization of the tire the mold is separated by inserting any desired form of breaking tool such, for instance, as that shown in Fig. 5 in the annular slot formed between the segmental annular flange 5 and the adjacent face of the mold member 2 and prying the mold members apart. This prying operation invariably separates the tread forming portion 3 of the mold from the mold member 2, thus insuring at all times that each of the tread forming portions shall be broken from the member 2.

Figures 5, 6:
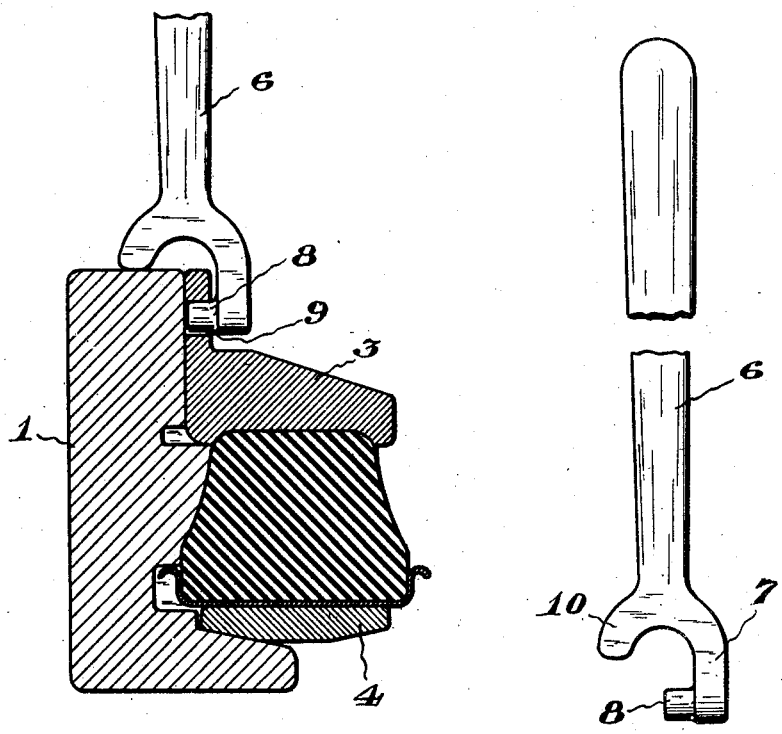
Fig. 5 is a plan view, with parts broken away, of a tool that is adapted to be used in connection with the mold illustrated in the preceding figures for breaking the tread forming portion of the mold away from the tire body and also for separating the mold sections.
Fig. 6 is a transverse, cross sectional view of a finished tire body after the removal of one of the mold sections showing the mold breaking tool in position for breaking away the tread forming portion of the mold.
Figure 7:
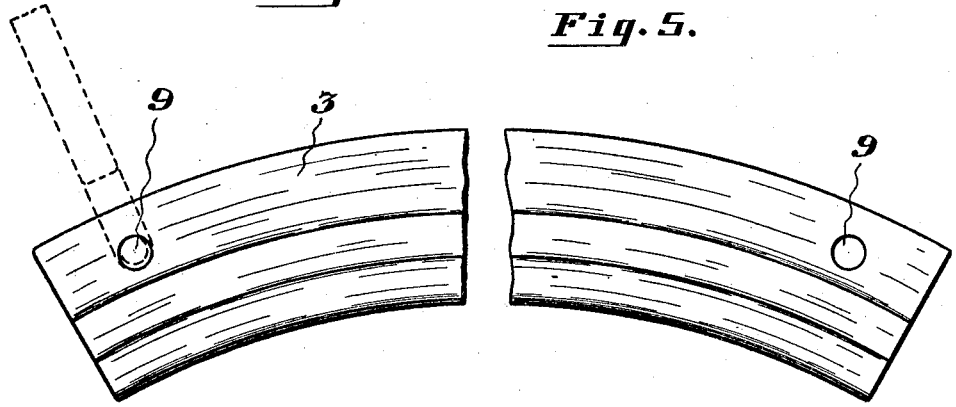
Fig. 7 is a side elevational view of one of the tread forming mold portions with a tool indicated in dotted outline as applied thereto.

After the mold section 2 is removed, the tread forming mold portions 3 are broken away from the body of the tire and from the mold section 1 by the use of the tools shown in Fig. 5 and illustrated in operative position in Fig. 6. The tool comprises an operating handle 6, a jaw portion 7 that carries a lug 8 adapted to enter into suitable apertures 9 that are formed in the end portions of the sections 3 and a pivot finger 10 that serves as a fulcrum about which the tool operates in breaking the mold section 3 from the mold assembly. The tool is used flatwise within the groove between the flange 5 and the mold portion 2 for initially breaking the mold. After the mold section 2 is removed as shown in Fig. 6, the tool lug 8 is inserted within the corresponding aperture 9 formed in the mold section 3 and the tool is operated to draw the tread forming portions 3 of the mold radially outward to break the same free from the tire body and also free from the mold portion 1.

The advantages of such construction will be self apparent. Damage to the molded tire is avoided which was previously caused by certain of the segmental members 3 separating from side member 1 whereas other segmental members separated from side member 2. With the present mold structure the mold invariably breaks between the parts 2 and 3.

Although only a single embodiment of the invention is herein described, the invention is not restricted to the particular form of tire mold shown but is capable of application to similar other molds without departing from the spirit and scope of the invention.

What I claim is:

1. A cushion tire mold comprising a pair of annular side members, one of which has an annular recess opening to the inner side thereof which is spaced inwardly from the periphery of the member to provide a breaking shoulder, the opposed side member having a flat inner face extending inwardly from its periphery and spaced laterally from said shoulder, and a segmental tread forming member carried between said side members, said tread forming member having a body portion extending into said recess and a peripheral flange extending outwardly from the body portion substantially to the periphery of the mold at the side thereof opposite that disposed in said recess, the flanged side of said tread forming member having a flat face abutting against said flat inner face of the opposed side member, said flange being spaced laterally from said shoulder to provide a circumferential breaking slot at the periphery of the mold solely between said flange and said shoulder.

2. A cushion tire mold comprising a pair of annular side members, one of which has an annular recess opening to the inner side thereof which is spaced inwardly from the periphery of the member to provide a breaking shoulder, the opposed side member having a flat inner face extending inwardly from its periphery and spaced laterally from said shoulder, and a segmental tread forming member carried between said side members, said tread forming member having a body portion extending into the recess and fitting within the outer peripheral wall of said recess, said tread forming member having a portion projecting laterally beyond said shoulder and provided with an outwardly projecting peripheral flange of substantially the same radial depth as the shoulder which is spaced from said shoulder and extends substantially to the periphery of the mold to provide a breaking slot solely between the flange and shoulder adapted to receive a suitable tool for breaking the recessed side member away from the tread forming member, the flanged side of said tread forming member having a flat face extending to the periphery of said flange which abuts against the flat inner face of the opposed side member, whereby the segments of the tread forming member may be removed by radial outward movement after said recessed side member has been broken away.

3. A cushion tire mold comprising a pair of laterally spaced endless mold members, one having a flat inner face and the other an annular recess opposite said flat face and an annular tread forming portion formed of segmental sections and fitting between said mold members, each section having a laterally extending flange adapted to extend into said groove and a flange extending outwardly between the mold members, said flange engaging the flat inner face of one mold member and being spaced from the inner face of the other mold member to form a breaking groove, said flange having an aperture to receive a breaking tool.

In testimony whereof I affix my signature.

ISIDORE J. REMARK.